US008638205B2

(12) United States Patent
Boehme et al.

(10) Patent No.: US 8,638,205 B2

(45) Date of Patent: Jan. 28, 2014

(54) DEVICE FOR PREVENTING A COLLISION OF A PIVOTING ELEMENT OF A VEHICLE

(75) Inventors: Aiko Boehme, Ingelheim (DE); Heiko Bald, Modautal (DE)

(73) Assignee: GM Global Technology Operations LLC, Detroit, MI (US)

(*) Notice: Subject to any disclaimer, the term of this patent is extended or adjusted under 35 U.S.C. 154(b) by 416 days.

(21) Appl. No.: 13/037,978

(22) Filed: Mar. 1, 2011

(65) Prior Publication Data

US 2011/0215916 A1 Sep. 8, 2011

(30) Foreign Application Priority Data

Mar. 2, 2010 (DE) ......................... 10 2010 009 889

(51) Int. Cl.
*B60Q 1/00* (2006.01)
*G08B 13/08* (2006.01)
*B60R 22/00* (2006.01)

(52) U.S. Cl.
USPC ..................... 340/436; 340/425.5; 340/545.1; 340/545.3; 701/49

(58) Field of Classification Search
None
See application file for complete search history.

(56) References Cited

U.S. PATENT DOCUMENTS

| | | | | |
|---|---|---|---|---|
| 4,888,532 | A * | 12/1989 | Josson | 318/480 |
| 6,676,186 | B2 | 1/2004 | Greif | |
| 7,026,930 | B2 | 4/2006 | Appel et al. | |
| 7,193,509 | B2 | 3/2007 | Bartels et al. | |
| 7,280,035 | B2 | 10/2007 | McLain et al. | |
| 2001/0042989 | A1 | 11/2001 | Greif | |
| 2002/0074959 | A1 * | 6/2002 | Van Wiemeersch | 318/445 |
| 2004/0200149 | A1 * | 10/2004 | Dickmann et al. | 49/26 |
| 2005/0174077 | A1 * | 8/2005 | Haag et al. | 318/280 |
| 2005/0242618 | A1 * | 11/2005 | Menard | 296/146.4 |
| 2007/0296242 | A1 * | 12/2007 | Frommer et al. | 296/146.4 |
| 2008/0294314 | A1 * | 11/2008 | Morris et al. | 701/49 |
| 2009/0000196 | A1 * | 1/2009 | Kollar et al. | 49/28 |
| 2010/0076651 | A1 * | 3/2010 | Nakakura et al. | 701/49 |
| 2011/0043633 | A1 | 2/2011 | Sarioglu et al. | |
| 2011/0196568 | A1 * | 8/2011 | Nickolaou et al. | 701/29 |

FOREIGN PATENT DOCUMENTS

| | | | |
|---|---|---|---|
| DE | 19537619 | A1 | 4/1997 |
| DE | 10232413 | A1 | 2/2004 |
| DE | 10312252 | A1 | 9/2004 |
| DE | 10340592 | A1 | 5/2005 |
| DE | 102004027457 | A1 | 12/2005 |
| DE | 102006051487 | B3 | 4/2008 |
| EP | 0968863 | A1 | 1/2000 |
| EP | 1265772 | A1 | 12/2002 |

(Continued)

OTHER PUBLICATIONS

British Patent Office, British Search Report for Application No. 1103441.0, dated Jul. 4, 2011.

(Continued)

*Primary Examiner* — Julie Lieu

(74) *Attorney, Agent, or Firm* — Ingrassia Fisher & Lorenz, P.C.

(57) ABSTRACT

A device is provided for preventing a collision between a pivoting element of a vehicle, with an obstacle located in its pivoting area, with a control unit which controls the pivoting movement of the vehicle pivoting element and with a lighting device which is coupled to the pivoting movement and emits light into the pivoting area. Depending on the reflection of the emitted light on the obstacle the control units intervenes in the pivoting movement.

17 Claims, 2 Drawing Sheets

(56) References Cited

FOREIGN PATENT DOCUMENTS

| | | | |
|---|---|---|---|
| EP | 1780360 | A1 | 5/2007 |
| WO | 2009092168 | A1 | 7/2009 |
| WO | 2009152956 | A1 | 12/2009 |

OTHER PUBLICATIONS

German Patent Office, German Search Report for German Application No. 102010009889.2, May 5, 2010.

* cited by examiner

DEVICE FOR PREVENTING A COLLISION OF A PIVOTING ELEMENT OF A VEHICLE

CROSS-REFERENCE TO RELATED APPLICATION

This application claims priority to German Patent Application No. 102010009889.2, filed Mar. 2, 2010, which is incorporated herein by reference in its entirety.

TECHNICAL FIELD

The technical field relates to a device, which is exclusively, or in addition to other functions, intended for preventing collisions between pivoting elements of a vehicle, such as, for example, hoods or doors, with objects and/or obstacles located in the pivoting area of the pivoting element of the vehicle.

BACKGROUND

A device for preventing the collision of tailgate of a vehicle is evident from international unexamined and published application WO 2009/092168 A1 which describes a driver assistance system, among other things for protecting the tailgate of a vehicle. The device comprises an imaging system which detects one or more objects in the vicinity of the tailgate. The data representing detected objects are converted by an algorithm into information depicting the three-dimensional area surrounding the tailgate. Among other things, by means of this information the distance between the tailgate and an object located in the vicinity can be determined. If this value is below a predetermined value so that a collision between the tailgate and the object is feared, a warning is given via acoustic or optical signals and the opening movement of the tailgate is interrupted.

However, the algorithm for converting the object data into the information representing the three-dimensional space is complex and requires a great detail of calculation so that a delayed response of the protective device and too late stopping of the tailgate movement can occur. In addition, inaccurate measurements can result in comparatively imprecise distance determination; this is to be feared particularly in the case of non-optimum light conditions, e.g., in an underground garage where the resolution and/or the delivered data quality is not precise. There is therefore a risk of collisions not being detected.

Against this background the at least one aim is to propose a device for preventing a collision between a pivoting vehicle element, more particularly a tailgate, of a vehicle with objects or obstacles located in its pivoting area, which is characterized by a particularly high degree of precision and reliability even in non-optimum light conditions. In addition, other aims, desirable features and characteristics will become apparent from the subsequent summary and detailed description, and the appended claims, taken in conjunction with the accompanying drawings and this background.

SUMMARY

The device in accordance with an embodiment of the invention comprises a control unit, which steers the pivoting movement of the pivoting vehicle element, and a lighting device which is coupled to the pivoting movement and emits light into the pivoting area, whereby depending on the reflection of the emitted light from the obstacle the control unit intervenes in the pivoting movement.

At least a first advantage is the relatively simple determination of the current distance between the pivoting vehicle element and any obstacle or objects located in the pivoting area which impedes movement. A further advantage of the device is the very high degree of precision and reliability, even in unfavorable light conditions, of recording the distance of the pivoting vehicle element from an obstacle and the thereby improved collision-preventing steering of the pivoting vehicle element.

The distance between a pivoting vehicle element and an obstacle can, for example, be determined by way of the intensity of the portion of the light the obstacle reflects back to the recording unit. A particularly practical application is parking a vehicle in an underground garage. Underground garages often have a relatively low ceiling or horizontal upper limitation of the underground garage space. If the tailgate of a vehicle is opened, for example automatically, in such a garage there is a risk of the tailgate coming into contact with the ceiling of the underground garage. By way of the device in accordance with the invention the control unit prevents a collision between the tailgate and the ceiling by preventing or interrupting the pivoting movement of the tailgate.

In an embodiment the lighting element comprises a vehicle light, preferably a vehicle rear light. Through this embodiment a lighting element generally already present in the vehicle is advantageously given an additional function, namely to emit light into the pivoting area.

In accordance with another embodiment the coupling to the pivoting movement of the vehicle pivoting element is particularly simple to implement in that the lighting element is arranged on the pivoting element.

In accordance with another embodiment a recording device is provided, which records at least portions of the emitted light reflected on the obstacle. Advantageously, devices already present in the vehicle for recording the surroundings of the vehicle can thus be used. Conceivable, for example, is the use of sensor systems available in the vehicle, such as any present parking sensors.

In accordance with another embodiment, the recording device comprises a camera system. In this embodiment, camera systems present in or on the vehicle can be used to record the vehicle surroundings. A camera system also has the advantage that the recording information can be shown on a display unit. A vehicle driver can therefore recognize possible obstacles even before the start of the pivoting movement and react accordingly.

In accordance with another embodiment, the light emitted into the pivoting area forms a light pattern on the obstacle, whereby the recording device generates information representing the shown light pattern, and whereby an evaluation unit evaluates this information to determine whether a collision-prevention intervention of the control unit in the pivoting movement of the pivoting vehicle element is necessary. By way of the light pattern, particularly if this has a symmetrical geometric structure, in an advantageous manner, particularly precise conclusions as to the distance between the vehicle pivoting element and the obstacle can be drawn.

The light pattern can be produced in different forms. Conceivable, for example, is a light pattern which on an obstacle with a smooth surface forms a predefined structure or a plurality of light points which are at predetermined distances from one another, for example in the form of concentric circles.

Depending on the distance between the obstacle and pivoting vehicle element, the distances between the light points or geometries and/or the size and/or shape of the image change. In this way the geometric shape of the obstacle can be determined. If an obstacle has a particular geometric shape, parts of the obstacle facing the tailgate are closer to the tailgate than other areas. This is shown by the distances between the light points recorded by the recording device. Via an appropriate evaluation algorithm the geometric shape of an obstacle can be determined. Preferably the evaluation unit therefore evaluates the size and/or the shape of the light pattern formed on the obstacle.

The evaluation of the size of the light pattern shown on the obstacle constitutes a particularly simple solution for determining the distance between the tailgate and obstacle through determining the size of given structures of the light pattern. In the same way the distance and shape of the obstacle can be determined by evaluating changes in the shape and/or distortion of the light pattern.

Methods suitable for the purposes set out here for evaluating the light pattern are known in themselves and can be found, for example in the publications by Ernst D. Dickmanns "Dynamic Vision for Perception and Control of Motion" and/or Bernd Jähne "Digitale Bildverarbeitung" [Digital image processing]. The emitted light can, for example, be in the form of a homogeneous light cone opening out in the direction of emission. In this way the lighting device emitting light into the pivoting area can be particularly simply designed. On the obstacle the light cone creates an illuminated surface delimited by the edge of the light cone. The distance between the tailgate and an obstacle can thus be determined. In other words: with increasing distance between the vehicle tailgate and the object the circular or elliptical illuminated area produced on the obstacle become smaller (figure).

In a further embodiment of the invention the control unit interrupts the pivoting movement of the vehicle tailgate if the reflected light allows a collision to be anticipated. Through this embodiment, a collision between the tailgate of a vehicle and an obstacle located in the pivoting area is prevented in a particularly reliable manner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
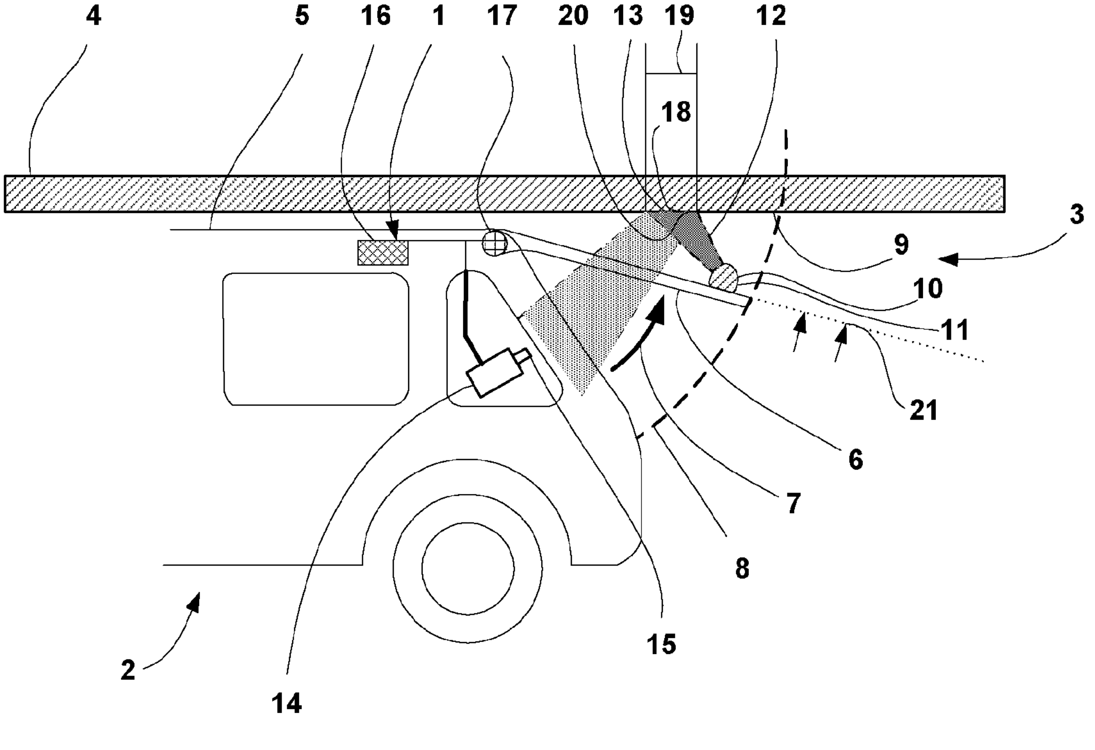
FIG. 1 shows a first example of an embodiment of a device in accordance with the invention.

FIG. 1 shows a device 1 in accordance with an embodiment of the invention as part of a vehicle 2, parking in a parking area 3, the ceiling 4 of which is relatively only slight higher than the roof 5 of the vehicle 2. A pivoting vehicle element, namely the tailgate 6, of the vehicle 2 can perform an automatic, i.e. gas pressure spring or servomotor-operated, pivoting movement 7 through a pivoting area 8. In the illustrated situation the tailgate 6 threatens to come into contact with the ceiling 4 of the space 3. The ceiling 4 of the space 3 thus constitutes an object or obstacle 9, which gives rise to the fear of a collision with the tailgate 6.

A lighting unit 10 in the form of a vehicle rear light 11 emits light 12 into the pivoting area 8. The light forms a patch of light on the ceiling 4, which reflects at least parts of the emitted light. This reflection 13 is directed at least partially in the direction of a recording device 14 for monitoring the pivoting area. A camera system 15 is an integral part of the device 14. The device 14 generates information representing the reflection 13 and evaluated by an evaluation unit 16 to determine whether an intervention with regard to controlling the pivoting movement of the tailgate 6 is required by the control unit 17.

The light 12 emitted into the pivoting area 8 forms a light cone 18 opening in the direction of emission. On the basis of the size 19 of a light cone reflected on the ceiling 4 and/or a patch of light 20 formed there, i.e., on the obstacle, the evaluation unit 16 can evaluate the information representing the light cone or patch of light to determine whether the control unit 17 must intervene in the movement of the tailgate 6, for example by stopping 21 the pivoting movement.

Figure 2:
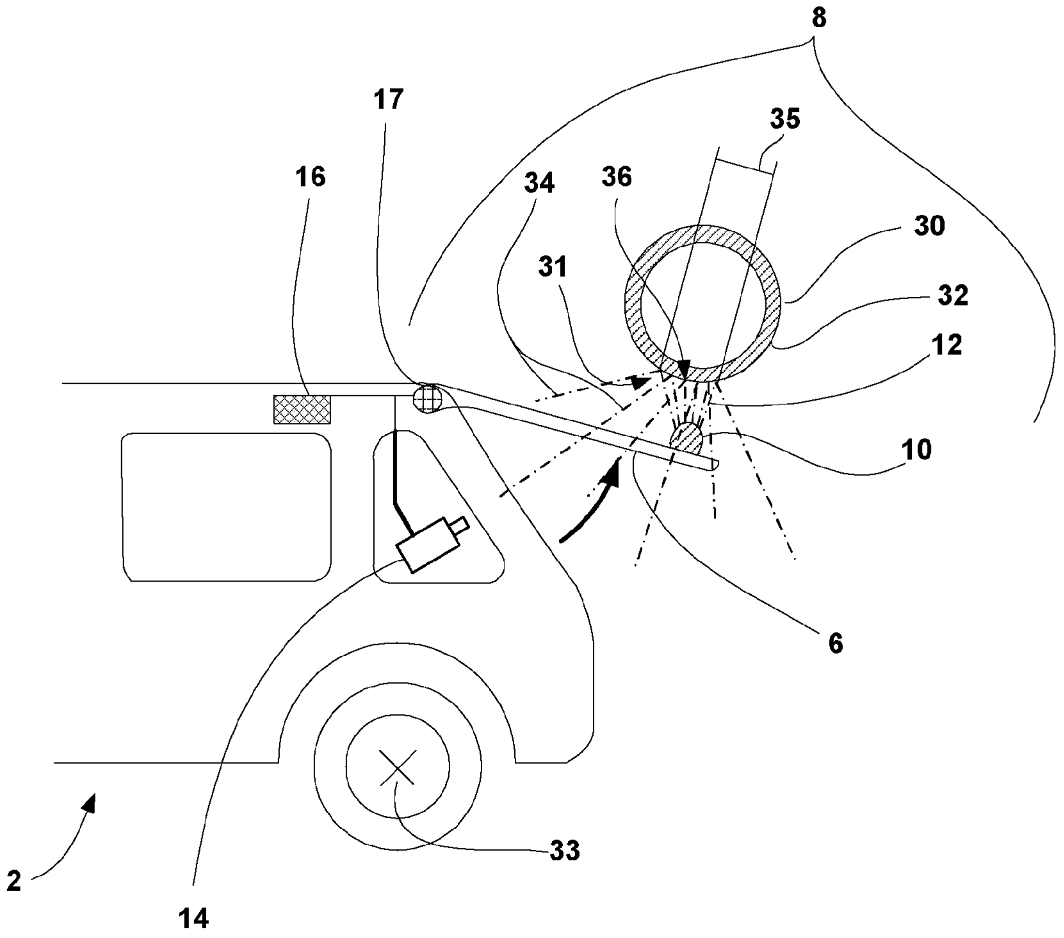
FIG. 2 shows a further example of embodiment of a device in accordance with the invention.

The embodiment of a device in accordance with the invention shown in FIG. 2 is essentially designed in the same way as the device shown in FIG. 1. As in the device shown in FIG. 1, the tailgate 6 of the vehicle 2 performs a pivoting movement in the pivoting area 8. The lighting device 10 emits light 12 into the pivoting area and produces a light pattern 31 on the obstacle 30.

In the example shown in FIG. 2 the obstacle is formed by a pipe 32, shown in cross section, running essentially transversely to the longitudinal axis of the vehicle, i.e., in parallel to an edge axis 33 of the vehicle and above the tailgate 6. The device 14 for recording the pivoting area records light 34 reflected from the obstacle 30. In particular, the size 35 and shape 36 of the light pattern 31 formed on the obstacle 30 are recorded. The evaluation unit 16 evaluates the information generated by the device 14 to determine whether control of the pivoting movement is necessary.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A device for preventing a collision between a pivoting element of a vehicle and an obstacle located in a pivoting area, comprising:

a control unit configured to control a pivoting movement of the pivoting element; and a lighting device coupled with the pivoting element and configured to emit a light into the pivoting area, wherein the control unit is configured to intervene in the pivoting movement based at least in part on a reflection of the light on the obstacle, and wherein the lighting device comprises a vehicle light.

2. The device in accordance with claim 1, wherein the vehicle light is a vehicle rear light.

3. The device in accordance with claim 1, wherein the lighting device is arranged on the pivoting element.

4. The device in accordance with claim 1, further comprising a recording device that is configured to record the reflection of the light on the obstacle.

5. The device in accordance with claim 4, wherein the recording device comprises a camera system.

6. The device in accordance with claim 4, wherein the light emitted into the pivoting area is configured to form a light pattern on the obstacle, and wherein the recording device is configured to generate information that represents the light pattern, and wherein an evaluation unit evaluates the information in determining if the control unit is to intervene in the pivoting movement.

7. The device in accordance with claim 6, wherein the evaluation unit evaluates a size of the light pattern formed on the obstacle.

8. The device in accordance claim 6, wherein the evaluation unit evaluates a shape of the light pattern formed on the obstacle.

9. The device in accordance with claim 1, wherein the control unit is configured to interrupt the pivoting movement if the reflection of the light indicates the collision.

10. A device for preventing a collision between a pivoting element of a vehicle and an obstacle located in a pivoting area, comprising:

a control unit configured to control a pivoting movement of the pivoting element;

a lighting device coupled with the pivoting element and configured to emit a light into the pivoting area, wherein the control unit is configured to intervene in the pivoting movement based at least in part on a reflection of the light on the obstacle; and a recording device that is configured to record the reflection of the light on the obstacle, wherein the light emitted into the pivoting area is configured to form a light pattern on the obstacle, and wherein the recording device is configured to generate information that represents the light pattern, and wherein an evaluation unit evaluates the information in determining if the control unit is to intervene in the pivoting movement.

11. The device in accordance with claim 10, wherein the lighting device comprises a vehicle light.

12. The device in accordance with claim 11, wherein the vehicle light is a vehicle rear light.

13. The device in accordance with claim 10, wherein the lighting device is arranged on the pivoting element.

14. The device in accordance with claim 10, wherein the recording device comprises a camera system.

15. The device in accordance with claim 10, wherein the evaluation unit evaluates a size of the light pattern formed on the obstacle.

16. The device in accordance claim 10, wherein the evaluation unit evaluates a shape of the light pattern formed on the obstacle.

17. The device in accordance with claim 10, wherein the control unit is configured to interrupt the pivoting movement if the reflection of the light indicates the collision.

* * * * *